United States Patent
Osborne et al.

(10) Patent No.: US 9,402,323 B2
(45) Date of Patent: Jul. 26, 2016

(54) POSITIONABLE KEYBOARD BEZEL

(71) Applicant: Lenovo (Singapore) Pte. Ltd., Singapore (SG)

(72) Inventors: Christopher Miles Osborne, Cary, NC (US); Aaron Michael Stewart, Raleigh, NC (US); Fusanobu Nakamura, Yamato (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 382 days.

(21) Appl. No.: 13/787,614

(22) Filed: Mar. 6, 2013

(65) Prior Publication Data

US 2014/0254123 A1 Sep. 11, 2014

(51) Int. Cl.
*H05K 5/00* (2006.01)
*G06F 1/16* (2006.01)

(52) U.S. Cl.
CPC .............. *H05K 5/0017* (2013.01); *G06F 1/162* (2013.01); *G06F 1/1616* (2013.01); *G06F 1/1666* (2013.01); *G06F 1/1675* (2013.01)

(58) Field of Classification Search
CPC ......... G06F 3/216; G06F 3/219; G06F 3/221; G06F 1/1615; G06F 1/1666
USPC ............... 361/679.11, 679.12; 200/5 EB, 5 D
See application file for complete search history.

(56) References Cited

U.S. PATENT DOCUMENTS

| | | | | |
|---|---|---|---|---|
| 5,534,891 A | * | 7/1996 | Takano | 345/169 |
| 5,602,715 A | * | 2/1997 | Lempicki et al. | 361/679.13 |
| 6,094,191 A | * | 7/2000 | Watanabe et al. | 345/168 |
| 6,771,494 B2 | * | 8/2004 | Shimano | 361/679.06 |
| 8,102,647 B2 | * | 1/2012 | Bhutani et al. | 361/679.11 |
| 2004/0126170 A1 | | 7/2004 | Hagerman | |
| 2013/0063882 A1 | * | 3/2013 | Tseng | 361/679.09 |
| 2013/0170124 A1 | * | 7/2013 | Pan et al. | 361/679.08 |

FOREIGN PATENT DOCUMENTS

| JP | H09-222937 A | 8/1997 |
|---|---|---|
| JP | 2004-227420 A | 8/2004 |
| JP | 2011-048536 A | 3/2011 |

OTHER PUBLICATIONS

JP Application No. 2014-043253, JPO Office Action of Mar. 3, 2015 (3 pages).

* cited by examiner

*Primary Examiner* — Tuan T Dinh
*Assistant Examiner* — Mukund G Patel
(74) *Attorney, Agent, or Firm* — Brian J. Pangrle

(57) ABSTRACT

A system can include a keyboard housing that includes a keyboard and a positionable keyboard bezel, a display housing that includes a display, a hinge that pivotably connects the keyboard housing and the display housing for orienting the display housing with respect to the keyboard housing, and a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing. Various other apparatuses, systems, methods, etc., are also disclosed.

19 Claims, 8 Drawing Sheets

Method 710

Provide a system that includes a keyboard housing and display housing pivotably orientable with respect to each other 712

↓

Pivot the display housing with respect to the keyboard housing 714

↓

Translate a keyboard bezel of the keyboard housing responsive to pivoting 716

Optional 

Method 730

Activate a keyboard for input responsive to orientation of a display housing with respect to a keyboard housing of a system 732

↓

Deactivate the keyboard for input responsive to orientation of the display housing with respect to the keyboard housing of the system 734

POSITIONABLE KEYBOARD BEZEL

TECHNICAL FIELD

Subject matter disclosed herein generally relates to technology for keyboards.

BACKGROUND

Various types of computing devices, display devices, computing and display devices, etc. exist where, for example, one device may cooperate with another device or component of an assembly or system. As an example, consider a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge, for example, that allows for pivoting of the housings to achieve a back-to-back orientation of the keyboard housing and the display housing. In such an orientation, the display may be used on one side as a tablet (e.g., consider a scenario where the display is a touchscreen display) while the keyboard faces outwardly from the opposing side. Various technologies and techniques described herein pertain to devices, components, assemblies, etc. that include a keyboard in a keyboard housing.

SUMMARY

A system can include a keyboard housing that includes a keyboard and a positionable keyboard bezel, a display housing that includes a display, a hinge that pivotably connects the keyboard housing and the display housing for orienting the display housing with respect to the keyboard housing, and a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

FIG. 7 is a diagram of examples of methods; and

DETAILED DESCRIPTION

Figure 1:
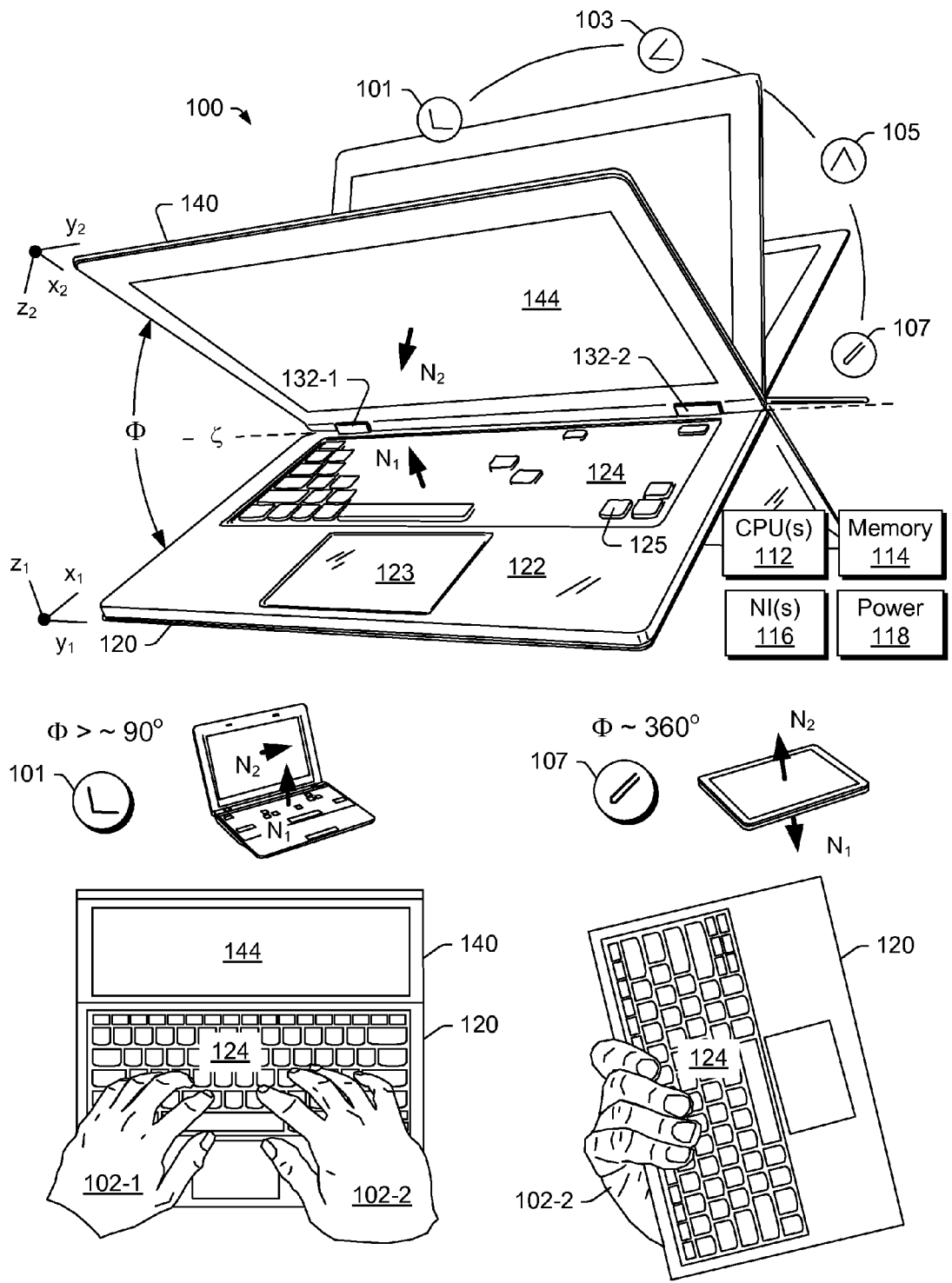
FIG. 1 is a diagram of an example of a system.

The following description includes the best mode presently contemplated for practicing the described implementations. This description is not to be taken in a limiting sense, but rather is made merely for the purpose of describing general principles of various implementations. The scope of invention should be ascertained with reference to issued claims.

As an example, a system may include a display in a display housing that cooperates with a keyboard in a keyboard housing, which may, for example, allow for input of information via the display in addition to, or as an alternative to, input of information via the keyboard. In such an example, the keyboard housing and the display housing may connect via a hinge (e.g., or hinges), for example, that allows for pivoting of the housings to achieve a back-to-back orientation of the keyboard housing and the display housing. In such an orientation, the display may be used on one side as a tablet (e.g., consider a scenario where the display is a touchscreen display) while the keyboard faces outwardly from the opposing side. Where keys of the keyboard remain depressible in the back-to-back orientation, upon grasping the system, a user may depress the keys, which, in turn, may affect the user's grasp, sensation of firmness of the user's grasp, cause an increase in grasping force, etc. As an example, a positionable keyboard bezel may adjust in a manner to improve user experience. For example, a positionable keyboard bezel may rise to a position approximately level with key touch surfaces of keys of a keyboard to provide a firm surface for grasping. As an example, a positionable keyboard may be positionable for locking keys of a keyboard or otherwise reducing travel distance (e.g., limiting or restricting depressibility, etc.). As an example, a positionable keyboard bezel may be positionable with respect to keys of a keyboard and optionally cooperate with one or more mechanisms that perform locking of the keys of the keyboard (e.g., or otherwise reduce key travel).

As an example, a mechanism or mechanisms may act to protect keys of a keyboard from damage, wear, etc. As an example, a positionable keyboard bezel may be positionable to reduce risk of damage, wear, etc., to a keyboard, for example, with or without locking of keys of the keyboard (e.g., or otherwise reducing key travel). For example, in the aforementioned tablet example, a user may be able to grasp the tablet in a manner where a firm surface or surfaces are provided on a keyboard side of the tablet that avoid activation of key depression mechanisms (e.g., springs, foams, etc.) that may be damaged, worn, etc. if grasp force was to be applied to the keys in a manner that allowed for depression of the keys (e.g., where the grasp force and the grasp duration on one or more keys may exceed the force and duration used in touch typing).

As an example, a system can include a keyboard housing that includes a keyboard and a positionable keyboard bezel, a display housing that includes a display, a hinge that pivotably connects the keyboard housing and the display housing for orienting the display housing with respect to the keyboard housing, and a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing.

FIG. 1 shows an example of a system 100 that includes a keyboard housing 120 and a display housing 140 that are pivotable with respect to each other via movement about one or more hinges 132-1 and 132-2. As an example, the system 100 may include one or more processors 112, memory 114 (e.g., one or more memory devices), one or more network interfaces 116, and one or more power cells 118. Such components may be, for example, housed with the keyboard housing 120, the display housing 140, the keyboard housing 120 and the display housing 140, etc.

As shown in the example of FIG. 1, the keyboard housing 120 includes a keyboard 124 with keys 125 and the display housing 140 includes a display 144. In such an example, the keyboard 124 is defined in a first Cartesian coordinate system as having a width along an x-axis ($x_1$), a length along a y-axis ($y_1$) and a height along a z-axis ($z_1$) that extends in a direction outwardly away from touch surfaces of keys 125 of the keyboard 124 and the display 144 is defined in a second Cartesian coordinate system as having a width along an x-axis ($x_2$), a length along a y-axis ($y_2$) and a height along a z-axis ($z_2$) that extends in a direction outwardly away from a viewing surface of the display 144.

As shown in the example of FIG. 1, the one or more hinges 132-1 and 132-2 pivotably connect the keyboard housing 120 and the display housing 140 for orienting the display housing 140 with respect to the keyboard housing 120. For example, orientations may include orientations definable with respect to an axis (e.g., or axes) such as $\zeta$ the axis and an angle $\Phi$ about that axis.

FIG. 1 shows some examples of orientations 101, 103, 105 and 107. The orientation 101 may be a notebook orientation where the angle $\Phi$ is about 90 degrees or more (e.g., or optionally somewhat less than about 90 degrees depending on position of a user, etc.). As shown, for the orientation 101, a user may use a finger or fingers of one or both hands 102-1 and 102-2 to depress keys 125 of the keyboard 124 (e.g., touch typing), for example, while viewing information being rendered to the display 144 of the display housing 140 (e.g., using the one or more processors 112, the memory 114, etc. that may be included in the keyboard housing 120, the display housing 140 or both). As an example, the keyboard housing 120 may include a frontal surface 122 and may include a touch input surface 123 (e.g., of a touch input device such as a touchpad). As shown in the example of FIG. 1, the frontal surface (e.g., in front of the keyboard 124) includes left and right portions, for example, defined with respect to the touch input surface 123. As shown, a user may use the frontal surface to support one or both hands 102-1 and 102-2. As an example, the keyboard 124 may include one or more other input devices (e.g., a control stick, etc.).

As to the orientation 103, it may correspond to a display orientation for viewing the display 144 where the keyboard 124 faces downward and the system 100 is supported by the keyboard housing 120 (e.g., by a rim about the keyboard 124, the frontal surface 122, etc.). As to the orientation 105, it may correspond to a "tent" orientation where the display 144 faces outwardly for viewing on one side of the tent and the keyboard 124 of the keyboard housing 120 faces outwardly on the other side of the tent.

The orientation 107 may be a tablet orientation where the angle $\Phi$ is about 360 degrees such that a normal outward vector $N_1$ of the keyboard 124 of the keyboard housing 120 and a normal outward vector $N_2$ of the display 144 of the display housing 140 are oriented in oppositely pointing directions, pointing away from each other; whereas, in contrast, for a closed orientation of the system 100 (e.g., where the angle $\Phi$ is about 0 degrees), the vectors $N_1$ and $N_2$ would be pointing toward each other.

As shown, for the orientation 107, a user may use one hand 102-2 (e.g., or both hands) to grasp the system 100 where a palm portion or one or more fingers of the hand 102-2 contact the keys 125 of the keyboard 124. In such a manner, one or more of the keys 125 may be depressed, which may distract from a user's experience, damage one or more of the keys 125, wear one or more key mechanisms of the keys 125, etc. (e.g., noting that grasp force, grasp duration, etc. may contribute to wear).

As an example, the system 100 may include a positioning mechanism that positions a keyboard bezel in a first state with respect to the keyboard 124 for a first orientation of the display housing 140 with respect to the keyboard housing 120 and that positions the keyboard bezel in a second state with respect to the keyboard 124 for a second orientation of the display housing 140 with respect to the keyboard housing 120. In such an example, the positionable keyboard bezel may mitigate one or more issues associated with the keys 125 of the keyboard 124 of the keyboard housing 120. For example, the positionable keyboard bezel may be, for the orientation 107, positioned approximately level with touch surfaces of the keys 125 to provide a firm, non-depressible contact surface, for example, for the hand 102-1, the hand 102-2 or both hands 102-1 and 102-2 (e.g., whether for a palm portion, one or more fingers, etc.). Such an approach may also act to reduce risk of damage, wear, etc., of one or more key mechanisms (e.g., a spring, a foam body, an actuator, etc.). As an example, through use of a positionable keyboard bezel, longevity of the keyboard 124 of the system 100 may be extended.

Figure 2:
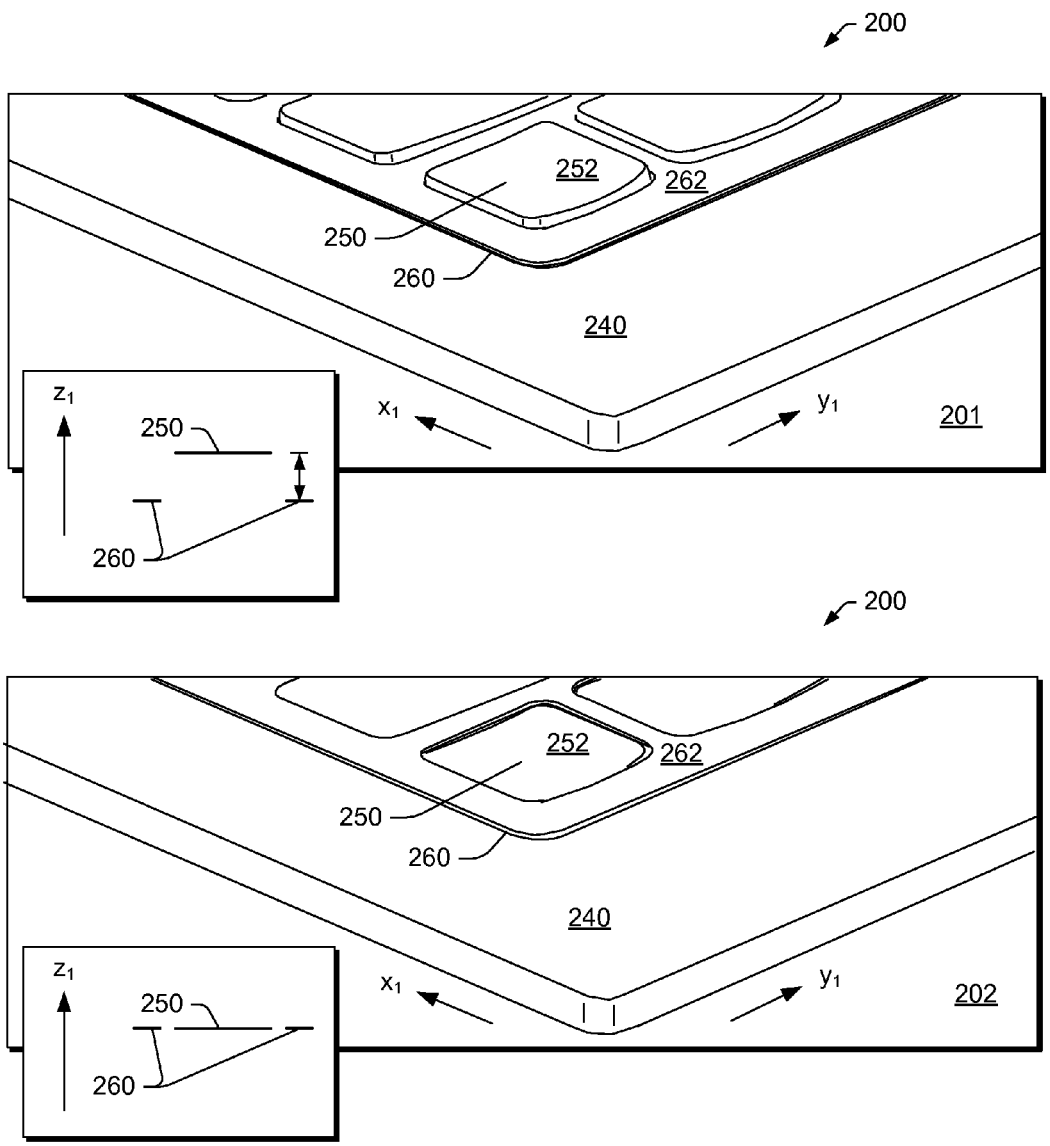
FIG. 2 is a diagram of an example of a system that includes a positionable keyboard bezel.

FIG. 2 shows an example of a system 200 in a first state 201 and in a second state 202. As shown, the system 200 includes a keyboard surface 240, keys 250 and a positionable keyboard bezel 260, which is positionable in the first state 201 and positionable in the second state 202, for example, via a positioning mechanism. As shown, the two states 201 and 202 may be described with respect to an axis such as a z-axis that corresponds to travel of the keys 250 (e.g., direction of depression being downward and direction of return being upward). In the example of FIG. 2, the keyboard bezel 260 can translate a distance upwardly (e.g., in an upward direction with respect to $z_1$) from the state 201 to the state 202 and can translate a distance downwardly from the state 202 to the state 201 (e.g., in a downward direction with respect to $z_1$). In the example of FIG. 2, an upper surface 262 of the keyboard bezel 260 is approximately level with touch surfaces 252 of the keys 250.

As shown in the example of FIG. 2, the keyboard bezel 260 may be shaped as a bezel grid that forms openings for the keys 250. For example, individual keys may be surrounded by respective portions of the bezel and pass through respective openings of the bezel. In such an example, each opening may be defined by a perimeter formed by a respective portion of the bezel where the perimeter may be defined, for example, with respect to planar coordinates along planar coordinate axes (see, e.g., $x_1$ and $y_1$ of FIG. 1).

As an example, a system may include a first state where a keyboard bezel is positioned in a first Cartesian coordinate system of a keyboard housing at a z position that is less than a z position of touch surfaces of keys of a keyboard of the keyboard housing; and a second state where the keyboard bezel is positioned in the first Cartesian coordinate system at a z position that is substantially equal to a z position of the touch surfaces of the keys of the keyboard of the keyboard housing. In such an example, where the system includes a display housing with a display, a first orientation may include a pivot angle for the display housing with respect to the keyboard housing selected from a range of orientation angles of approximately 90 degrees to approximately 180 degrees and a second orientation may include a pivot angle for the display housing with respect to the keyboard housing of approximately 360 degrees (e.g., where a z-axis of the display and a z-axis of the keyboard point away from each other). In such an example, the state 201 may be associated with the first orientation and the state 202 may be associated with the second orientation. As an example, a positioning mechanism may cause the keyboard bezel 260 to translate responsive to orientation to thereby place the keyboard bezel 260, for example, in the state 201 for the first orientation and in the state 202 for the second orientation.

As mentioned, a bezel may translate along a z-axis outwardly from a first state to a second state. As an example, a positioning mechanism may position the keyboard bezel 260 in the second state 202 by translating the keyboard bezel 260 from the first state 201 in the direction of the $z_1$-axis of the keyboard surface 240.

As mentioned, a bezel may translate along a z-axis downwardly or inwardly from a second state to a first state. As an example, a positioning mechanism may position the keyboard bezel 260 in the first state 201 by translating the keyboard bezel 260 from the second state 202 in a direction opposite to the direction of the $z_1$-axis of the keyboard surface 240.

As an example, the keyboard bezel 260 may include portions that extend underneath the keys 250, for example, to hinder movement of the keys 250 when the keyboard bezel 260 is positioned in the second state 202. In such a manner, the keyboard bezel 260 may lock the keys 250 (e.g., preventing depression of the keys 250 downwardly or inwardly with respect to the $z_1$-axis). As an example, portions of the keyboard bezel 260 may extend underneath the keys 250 in at least a direction along one of the axes of a keyboard (see, e.g., $x_1$ and $y_1$ of FIG. 1). As an example, in a second orientation of a display housing with respect to a keyboard housing (see, e.g., the orientation 107 of FIG. 1), a positioning mechanism may prevent depression of keys of a keyboard of the keyboard housing in a direction opposite to the direction of a z-axis of the keyboard.

Figure 3:
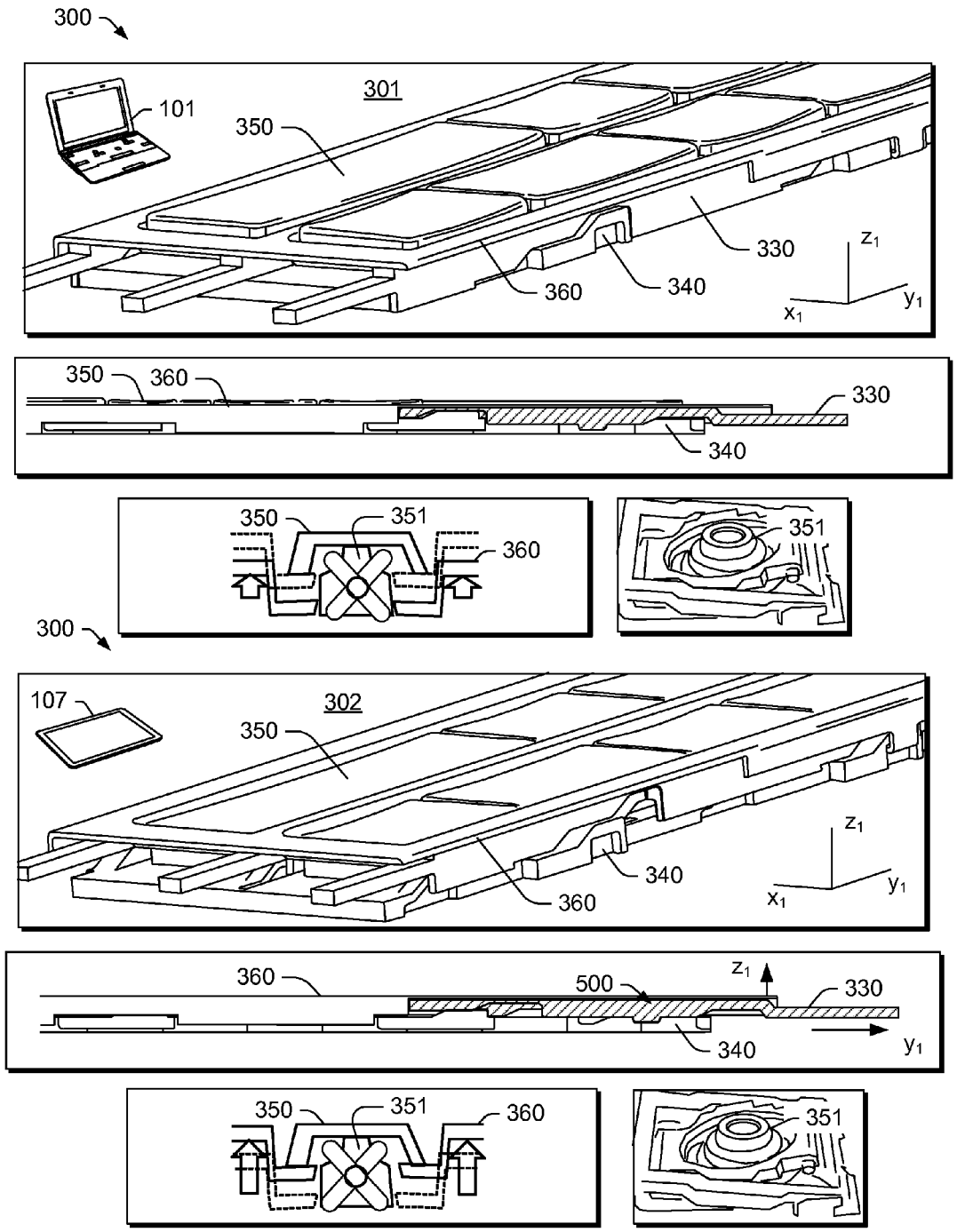
FIG. 3 is a diagram of an example of a system that includes a positionable keyboard bezel.

FIG. 3 shows an example of a system 300 in a first state 301 and in a second state 302 where the first state 301 may correspond to a first orientation such as the orientation 101 of FIG. 1 and where the second state 302 may correspond to a second orientation such as the orientation 107 of FIG. 1. The system 300 includes a positioning mechanism that includes a rail 330 that rides on a base 340. As indicated, by translating the rail 330 in a direction along y1, the rail 330 rises in a direction along z1 to thereby position a bezel 360 with respect to keys 350. As shown, the rail 330 and the base 340 may include sloping portions that provide for moving the rail 330 upwardly and downwardly when translated laterally with respect to the base 340. As shown in the example of FIG. 3, the rail 330 may be a gang of rails, for example, where a rail may exist along an outermost row of keys, an outermost column of keys, an inner row of keys, an inner column of keys, etc. For example, while the example of FIG. 3 shows a plurality of rails 330 as being between rows of the keys 350 and moving laterally along the $y_1$-axis, a system may include a plurality of rails that are between columns of keys and that move laterally along the $x_1$-axis. As an example, a number of rails, location of rails, etc., may be selected to provide support for a positionable bezel such as the bezel 360 (e.g., which may be configured for positioning whether rails move laterally, vertically, etc.).

FIG. 3 also shows examples where the bezel 360 includes portions that extend beneath keys 350 such that the positioning mechanism causes the bezel 360 to rise and contact the keys 350 to prevent depression of the keys 350 for the second state 302 and such that the positioning mechanism causes the bezel 360 to descend and move away from the keys 350 to allow for depression of the keys 350 for the first state 301. As an example, such portions of the bezel 360 may extend from a perimeter of the bezel 360 that is orthogonal to a longitudinal rail direction. For example, where rails extend along the direction $y_1$, the portions may extend beneath keys from a perimeter along $x_1$ where the portions extend along the direction $y_1$. As an example, where rails extend along the direction $x_1$, the portions may extend beneath keys from a perimeter along $y_1$ where the portions extend along the direction $x_1$. As an example, portions may extend in one or more directions (e.g., optionally without regard to a lateral translation direction of a rail).

As an example, a rail or rails may include one or more portions that extend beneath a key (or keys) to perform the functions described with respect to the foregoing examples where the bezel 360 includes portions that extend beneath the keys 350. As an example, a rail may include a portion or portions that extend outwardly away from a longitudinal axis of a rail.

As shown in FIG. 3, a key mechanism may include a rubber (e.g., foam rubber, etc.) component 351, which may be elastic and become damaged, worn, etc., if subject to excessive force, frequency of force, etc. As an example, a key mechanism may be a so-called island-style key mechanism (e.g., consider the LENOVO® THINKPAD® T430 keyboard) that aims to provide tactile feedback to enhance a user's experience. As an example, an individual character key may include dimensions of about 8 mm by about 8 mm, about 7 mm by about 7.5 mm, etc. As an example, spacing between neighboring character keys may be about 10 mm, about 10.5 mm, etc. As to some examples of other types of keys, consider a spacebar key of about 50 mm by about 7 mm or about 8 mm, an escape key or a delete key of about 7 mm by about 11 mm or about 11 mm by about 5 mm, a backspace key of about 17 mm or about 18 mm by about 7.5 mm, etc.

As an example, a system may include a positioning mechanism that includes a rail that has a position dependent on pivot angle of a display housing with respect to a keyboard housing. As an example, a system may include a positioning mechanism that includes a cam, for example, that has a rotational position dependent on pivot angle of a display housing with respect to a keyboard housing (e.g., via a hinge axel or other mechanism). In such an example, a rail may be provided that contacts the cam and that contacts a keyboard bezel to position the keyboard bezel in a manner dependent on pivot angle of the display housing with respect to the keyboard housing (e.g., where the rail rides on the cam and translates responsive to rotation of the cam).

Figure 4:
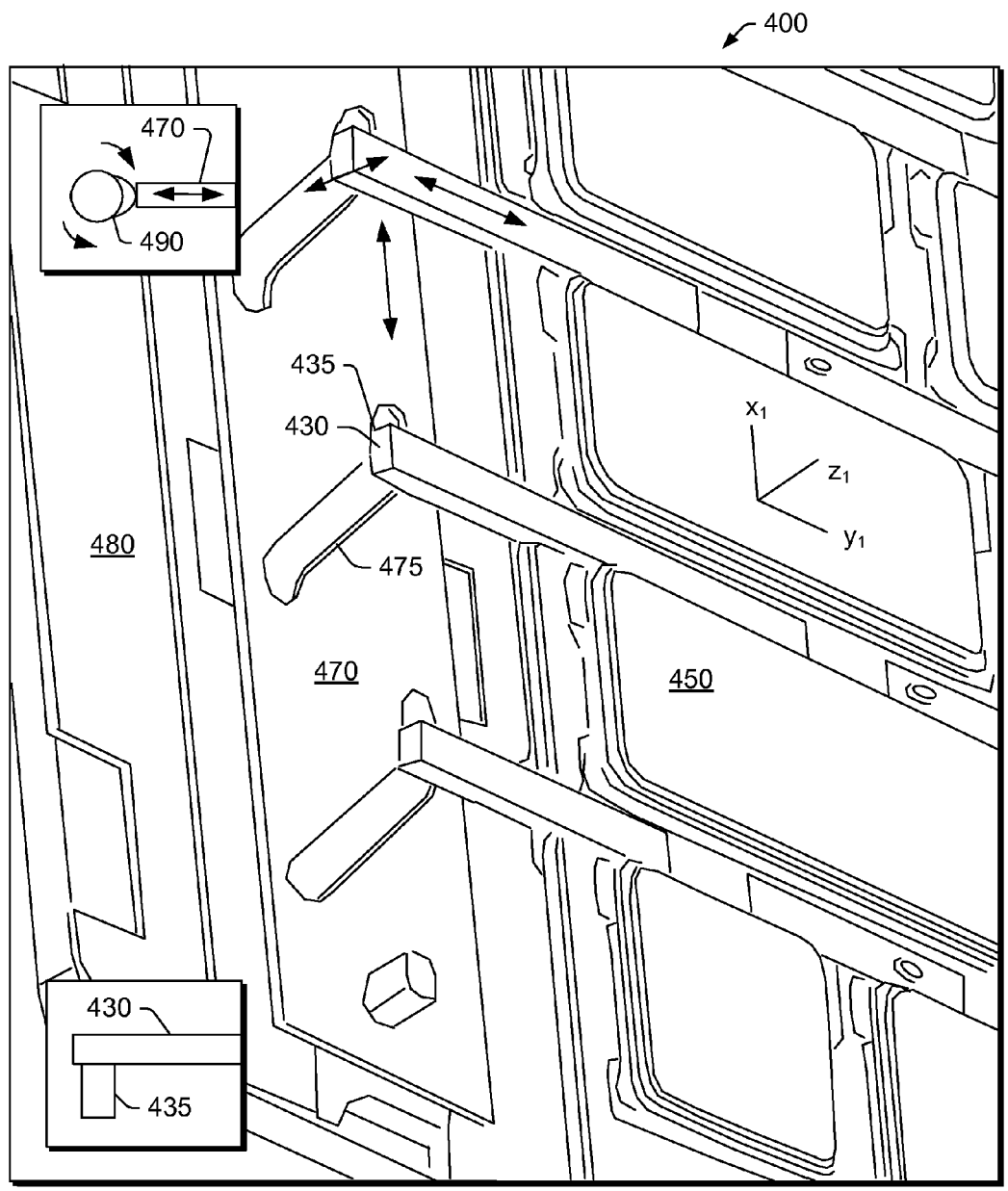
FIG. 4 is a diagram of an example of a system that includes a positionable keyboard bezel.

FIG. 4 shows an example of a system 400 that includes a positioning mechanism for positioning a keyboard bezel (not shown) that includes a plurality of rails 430 (e.g., a gang of rails) located between rows of keys 450 that cooperate with a plate 470 of a keyboard component 480. In such an example, translation of the plate 470 along an $x_1$-axis causes the rails 430 to translate along any $y_1$-axis. In such an example, the plate 470 includes slots 475 that receive prongs 435 of individual rails 430 where the shape of the slots 475 causes the rails 430 to translate as the plate 470 translates (e.g., in a substantially orthogonal manner). In such an example, the prongs 435 of the individual rails 430 as received by the slots 475 of the plate 470 may be sufficient long to not disengage the slots 475 as the rails 430 rise and descend (e.g., with respect to a base such as the base 340 of FIG. 3).

As an example, the system 400 may include a cam 490 that rotates to cause the plate 470 to translate. As an example, an end of the plate 470 may be in contact with the cam 490, for example, via a spring or other biasing mechanism. As an example, the cam 490 may be part of or otherwise couple to a hinge or hinges that allow for pivoting of a display housing with respect to a keyboard housing. In such an arrangement, pivoting may cause rotation of the cam 490 and thereby translation of the plate 470 (e.g., or other component of a positioning mechanism).

Figure 5:
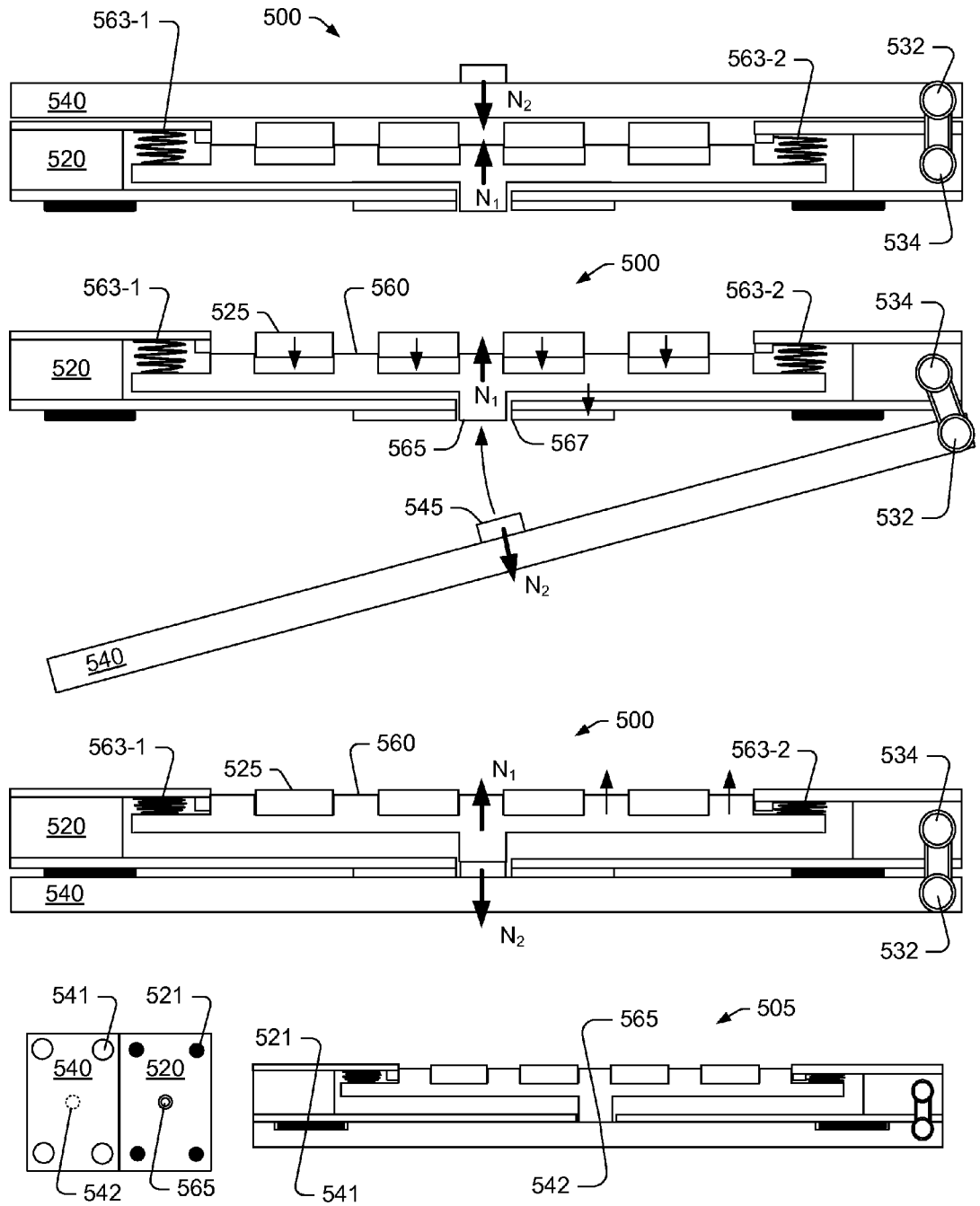
FIG. 5 is a diagram of examples of systems.

FIG. 5 shows an example of a system 500 and an example of a system 505 where each of the systems may include a keyboard housing 520, keys 525, a hinge component 532, a hinge component 534, a display housing 540, a keyboard bezel 560, and springs 563-1 and 563-2. As to the system 500, the bezel 560 includes a stem 565 that extends into an opening 567 of the keyboard housing 520 and the display housing 540 includes a stem 545 that extends outwardly from a back surface of the display housing 540. As shown, when the display housing 540 is oriented in a back-to-back orientation with the keyboard housing 520, the stems 545 and 565 contact and the stem 565 is pushed upwardly to translate the bezel 560 to a position where it is approximately level with touch surfaces of the keys 525 and where it may support the keys 525 in a manner that prevents depression of the keys 525. In such an example, the springs 563-1 and 563-2 are compressed. When the system 500 is re-oriented by rotating the one or both of the housings 520 and 540, the springs 563-1 and 563-2 cause the bezel 560 to translate to a downward position below the touch surfaces of the keys 525, while, for example, also unlocking the keys 525.

As to the example 505, the display housing 540 includes recesses 541 that accommodate feet 521 of the keyboard housing 520. In such a manner, the display housing 540 may include a target surface 542, for example, rather than a stem (see, e.g., the stem 545). As shown, by orienting the housings 520 and 540 back-to-back, the feet 521 are received by the recesses 541 and the target surface 542 contacts the stem 565 of the bezel 560 (e.g., or a component operatively connected to the bezel 560) to position the bezel 560 approximately level with the keys 525 where the keys 525 may also be locked. In the example system 505, the recesses 541 and the feet 521 may contact and provide additional stability for the system 505 when in the back-to-back orientation. For example, where the feet 521, inner surfaces of the recesses 541, etc., are "rubbery" or "sticky" (e.g., sufficient friction coefficient) the housings 520 and 540 may be limited or less likely to move laterally with respect to each other in the back-to-back orientation.

As an example, a system can include a positioning mechanism that includes at least one spring that applies force to a keyboard bezel. For example, the system 500 includes one or more springs 563-1 and 563-2 that apply force to the keyboard bezel 560.

As an example, a system can include a display housing that includes an extension (e.g., a stem) that can push a keyboard bezel upward. For example, a system can include a display housing that includes an extension and where a keyboard housing includes an opening configured to receive the extension in an orientation of the display housing with respect to the keyboard housing (e.g., a back-to-back or "tablet" orientation) for positioning the keyboard bezel in a state such as a level state (e.g., approximately level to touch surfaces of keys of the keyboard). As an example, a system can include a positioning mechanism that includes one or more springs that apply force to a keyboard bezel for forcing the keyboard bezel from one state to another state.

As an example, a keyboard housing may include an extension (e.g., a stem, etc.) that may be pushed by a surface of a display housing. As an example, a system may include a keyboard bezel that includes an extension and a display housing that includes a surface configured to contact the extension in an orientation of the display housing with respect to the keyboard housing for positioning the keyboard bezel in a state (e.g., a state where keys of a keyboard of the keyboard housing are locked, where the keyboard bezel is approximately level with touch surfaces of keys, etc.).

As an example, a system can include one or more springs that can apply forces to cause a bezel to move from one state to another state. As an example, a positioning mechanism may include one or more springs. As an example, a positioning mechanism can include a spring that applies force to a keyboard bezel for forcing the keyboard bezel from one state to another state, for example, in a manner dependent on orientation of a keyboard housing with respect to a display housing of the system.

As an example, a keyboard bezel may be configured for translation along a z-axis inwardly from one state to another state. As an example, a keyboard bezel may translate laterally, for example, in a planar direction such as along an x-axis or along a y-axis of an x,y-plane. As an example, such a bezel may include portions that extend underneath keys of a keyboard, for example, in at least a direction along one of the axes of a plane of the keyboard (e.g., an x,y-plane, etc.).

Figure 6:
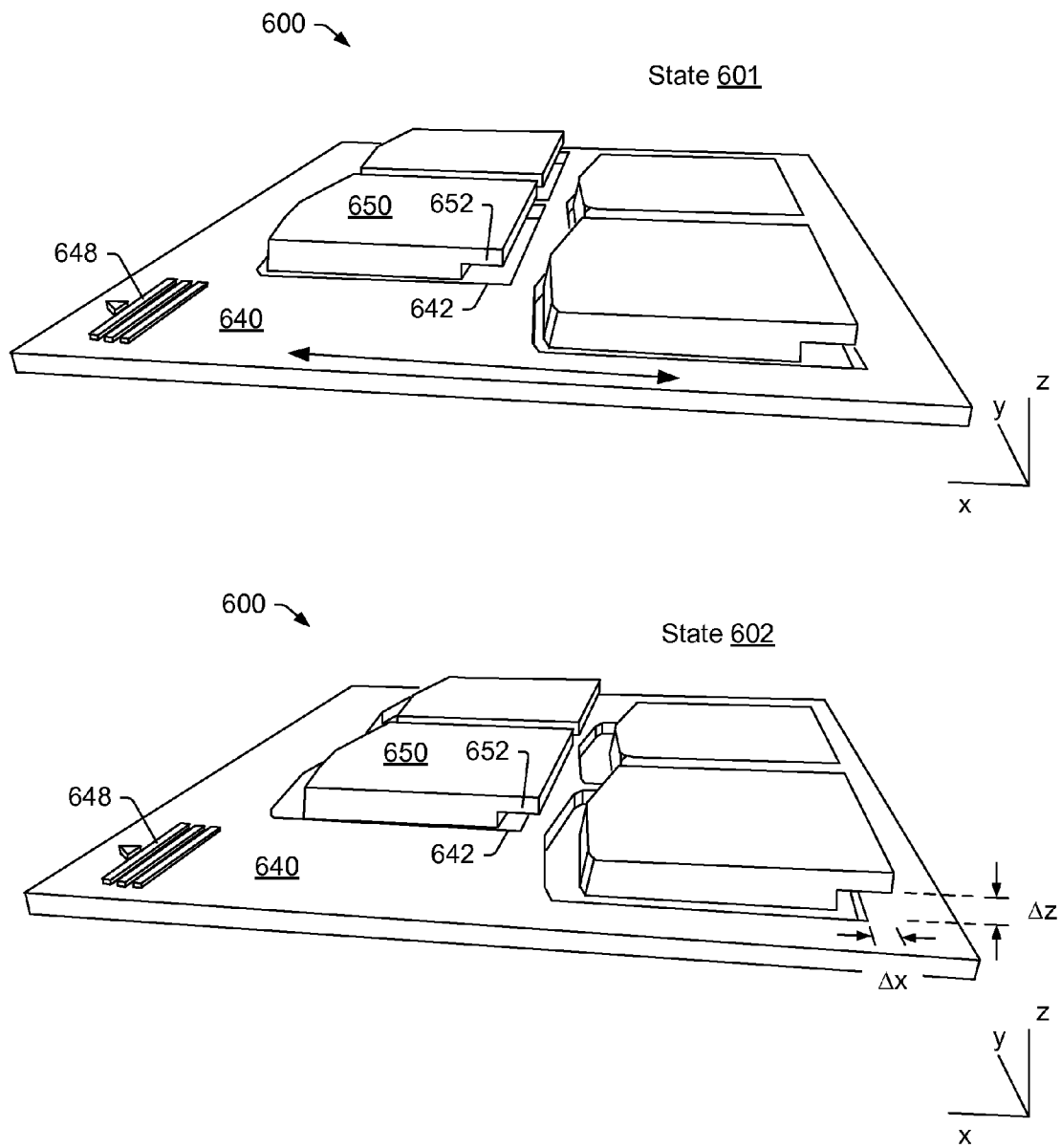
FIG. 6 is a diagram of an example of a system that includes a positionable keyboard bezel.

FIG. 6 shows an example of a system 600 in a first state 601 and in a second state 602. In the example of FIG. 6, the system 600 includes a bezel 640 and keys 650 that include steps 652 (e.g., individual keys include a step). As shown, in the first state 601, perimeters 642 that define openings in the bezel 640 for individual keys do not interfere with depression of the keys 650. However, when the bezel 640 is translated laterally along an x-axis, for example, with aid of a ridge or ridges 648 (e.g., or other feature), the perimeters 642 are positioned beneath the respective steps 652 of the keys 650 to thereby reduce downward travel of the keys 650. In the example of FIG. 6, for the second state 602, the perimeters 642 of the bezel.

FIG. 7 shows an example of a method 710 and an example of a method 730. As to the method 710, it can include a provision block 712 for providing a system that includes a keyboard housing and display housing pivotably orientable with respect to each other, a pivot block 714 for pivoting the display housing with respect to the keyboard housing, and a translation block 716 for translating a keyboard bezel of the keyboard housing responsive to the pivoting. As to the method 730, it can include a activation block 732 for activating a keyboard for input responsive to orientation of a display housing with respect to a keyboard housing of a system and a deactivation block 734 for deactivating the keyboard for input responsive to orientation of the display housing with respect to the keyboard housing of the system. As shown in the example of FIG. 7, the method 730 may loop between the blocks 732 and 734, for example, depending on orientation of the display housing with respect to the keyboard housing (see, e.g., the system 100 of FIG. 1). As an example, the activation and the deactivation may be mechanical, electrical or both mechanical and electrical. As to mechanical, a component may contact a key or a key mechanism to hinder movement to deactivate and then de-contact the key or the key mechanism to allow for movement to activate. As to electrical, as an example, a switch may be provided that responds to orientation to activate and deactivate a keyboard for input. As an example, the methods 710 and 730 may be performed together such that translation of the keyboard bezel and activating/deactivating occur responsive to pivoting of a display housing with respect to a keyboard housing of a system.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory chip, a memory card, a storage disk, etc.) and referred to as a computer-readable storage medium.

Figure 8:
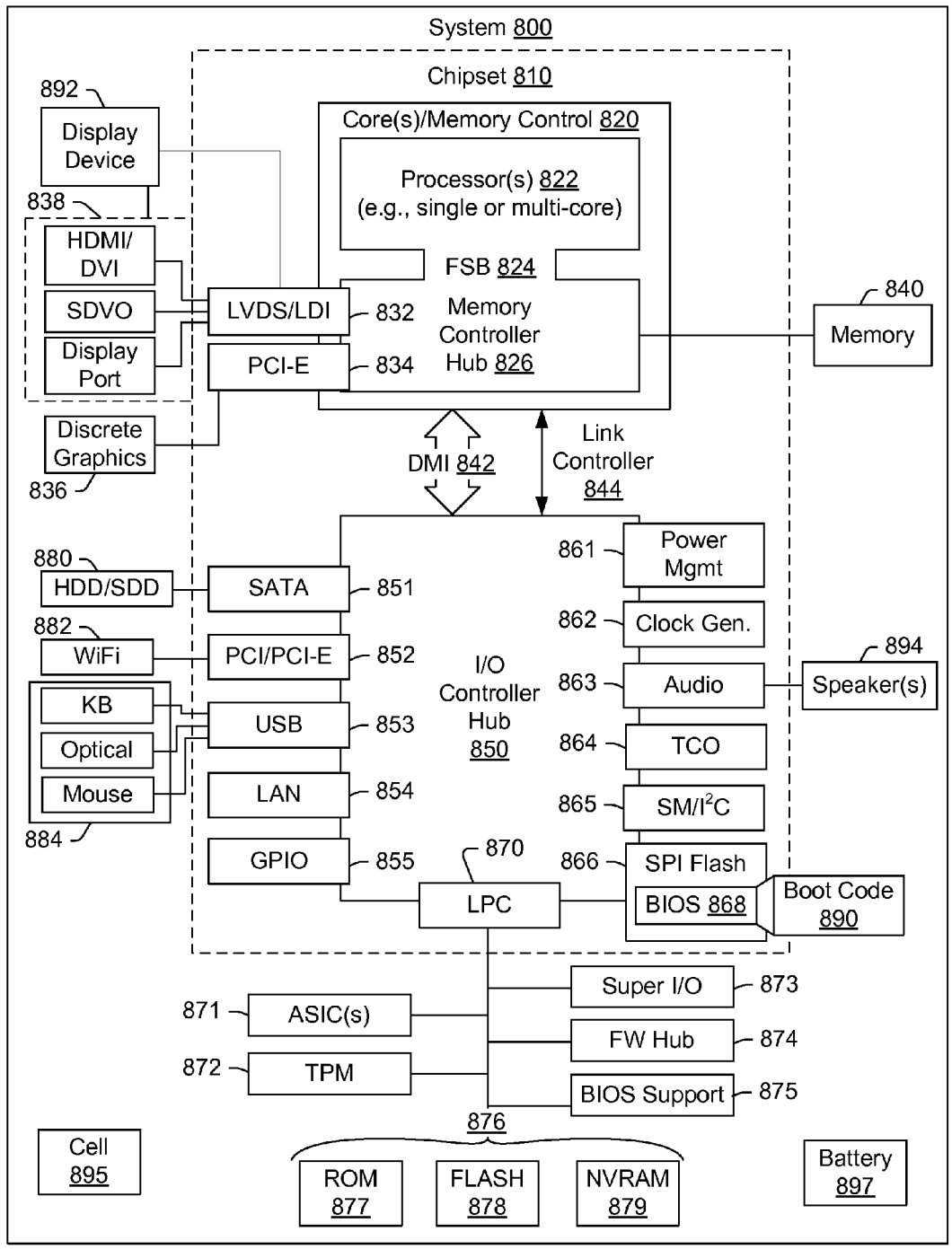
FIG. 8 is a diagram of an example of a system that includes one or more processors.

While various examples of circuits or circuitry have been discussed, FIG. 8 depicts a block diagram of an illustrative computer system 800. The system 800 may be a desktop computer system, such as one of the ThinkCentre® or Think-Pad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 800. As an example, a system such as the system 100 of FIG. 1 may include at least some of the features of the system 800.

As shown in FIG. 8, the system 800 includes a so-called chipset 810. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 8, the chipset 810 has a particular architecture, which may vary to some extent depending on brand or manufacturer. The architecture of the chipset 810 includes a core and memory control group 820 and an I/O controller hub 850 that exchange information (e.g., data, signals, commands, etc.) via, for example, a direct management interface or direct media interface (DMI) 842 or a link controller 844. In the example of FIG. 8, the DMI 842 is a chip-to-chip interface (sometimes referred to as being a link between a "northbridge" and a "southbridge").

The core and memory control group 820 include one or more processors 822 (e.g., single core or multi-core) and a memory controller hub 826 that exchange information via a front side bus (FSB) 824. As described herein, various components of the core and memory control group 820 may be integrated onto a single processor die, for example, to make a chip that supplants the conventional "northbridge" style architecture.

The memory controller hub 826 interfaces with memory 840. For example, the memory controller hub 826 may provide support for DDR SDRAM memory (e.g., DDR, DDR2, DDR3, etc.). In general, the memory 840 is a type of random-access memory (RAM). It is often referred to as "system memory".

The memory controller hub 826 further includes a low-voltage differential signaling interface (LVDS) 832. The LVDS 832 may be a so-called LVDS Display Interface (LDI) for support of a display device 892 (e.g., a CRT, a flat panel, a projector, etc.). A block 838 includes some examples of technologies that may be supported via the LVDS interface 832 (e.g., serial digital video, HDMI/DVI, display port). The memory controller hub 826 also includes one or more PCI-express interfaces (PCI-E) 834, for example, for support of discrete graphics 836. Discrete graphics using a PCI-E interface has become an alternative approach to an accelerated graphics port (AGP). For example, the memory controller hub 826 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 850 includes a variety of interfaces. The example of FIG. 8 includes a SATA interface 851, one or more PCI-E interfaces 852 (optionally one or more legacy PCI interfaces), one or more USB interfaces 853, a LAN interface 854 (more generally a network interface), a general purpose I/O interface (GPIO) 855, a low-pin count (LPC) interface 870, a power management interface 861, a clock generator interface 862, an audio interface 863 (e.g., for speakers 894), a total cost of operation (TCO) interface 864, a system management bus interface (e.g., a multi-master serial computer bus interface) 865, and a serial peripheral flash memory/controller interface (SPI Flash) 866, which, in the example of FIG. 8, includes BIOS 868 and boot code 890. With respect to network connections, the I/O hub controller 850 may include integrated gigabit Ethernet controller lines multiplexed with a PCI-E interface port. Other network features may operate independent of a PCI-E interface.

The interfaces of the I/O hub controller 850 provide for communication with various devices, networks, etc. For example, the SATA interface 851 provides for reading, writing or reading and writing information on one or more drives 880 such as HDDs, SDDs or a combination thereof. The I/O hub controller 850 may also include an advanced host controller interface (AHCI) to support one or more drives 880. The PCI-E interface 852 allows for wireless connections 882 to devices, networks, etc. The USB interface 853 provides for input devices 884 such as keyboards (KB), one or more optical sensors, mice and various other devices (e.g., microphones, cameras, phones, storage, media players, etc.). On or more other types of sensors may optionally rely on the USB interface 853 or another interface (e.g., $I^2C$, etc.). As to microphones, the system 800 of FIG. 8 may include hardware (e.g., audio card) appropriately configured for receipt of sound (e.g., user voice, ambient sound, etc.).

In the example of FIG. 8, the LPC interface 870 provides for use of one or more ASICs 871, a trusted platform module (TPM) 872, a super I/O 873, a firmware hub 874, BIOS support 875 as well as various types of memory 876 such as ROM 877, Flash 878, and non-volatile RAM (NVRAM) 879. With respect to the TPM 872, this module may be in the form of a chip that can be used to authenticate software and hardware devices. For example, a TPM may be capable of performing platform authentication and may be used to verify that a system seeking access is the expected system.

The system 800, upon power on, may be configured to execute boot code 890 for the BIOS 868, as stored within the SPI Flash 866, and thereafter processes data under the control of one or more operating systems and application software (e.g., stored in system memory 840). An operating system may be stored in any of a variety of locations and accessed, for example, according to instructions of the BIOS 868. Again, as described herein, a satellite, a base, a server or other machine may include fewer or more features than shown in the system 800 of FIG. 8. Further, the system 800 of FIG. 8 is shown as optionally include cell phone circuitry 895, which may include GSM, CDMA, etc., types of circuitry configured for coordinated operation with one or more of the other features of the system 800. Also shown in FIG. 8 is battery circuitry 897, which may provide one or more battery, power, etc., associated features (e.g., optionally to instruct one or more other components of the system 800). As an example, a SMBus may be operable via a LPC (see, e.g., the LPC interface 870), via an I²C interface (see, e.g., the SM/I²C interface 865), etc.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A system comprising:
    a keyboard housing that comprises a keyboard and a positionable keyboard bezel, the keyboard defined in a first Cartesian coordinate system as having a width along an x-axis, a length along a y-axis and a height along a z-axis that extends in a direction outwardly away from touch surfaces of keys of the keyboard;
    a display housing that comprises a display, the display defined in a second Cartesian coordinate system as having a width along an x-axis, a length along a y-axis and a height along a z-axis that extends in a direction outwardly away from a viewing surface of the display;
    a hinge that pivotably connects the keyboard housing and the display housing for orienting the display housing with respect to the keyboard housing; and
    a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing wherein the second orientation comprises a pivot angle for the display housing with respect to the keyboard housing of approximately 360 degrees wherein the z-axis of the display and the z-axis of the keyboard point away from each other, and wherein the second state comprises portions of the keyboard bezel positioned in the first Cartesian coordinate system at a z position that is substantially equal to a z position of the touch surfaces of the keys and other portions of the keyboard bezel that extend underneath the keys.

2. The system of claim 1 wherein the first state comprises the keyboard bezel positioned in the first Cartesian coordinate system at a z position that is less than a z position of the touch surfaces of the keys of the keyboard.

3. The system of claim 1 wherein the first orientation comprises a pivot angle for the display housing with respect to the keyboard housing selected from a range of orientation angles of approximately 90 degrees to approximately 180 degrees.

4. The system of claim 1 wherein the keyboard bezel comprises a bezel grid that forms openings for the keys of the keyboard.

5. The system of claim 1 wherein the positioning mechanism positions the keyboard bezel in the second state by translating the keyboard bezel from the first state in the direction of the z-axis of the keyboard.

6. The system of claim 1 wherein the positioning mechanism positions the keyboard bezel in the first state by translating the keyboard bezel from the second state in a direction opposite to the direction of the z-axis of the keyboard.

7. The system of claim 1 wherein in the second orientation of the display housing with respect to the keyboard housing, the positioning mechanism prevents depression of the keys of the keyboard in a direction opposite to the direction of the z-axis of the keyboard.

8. The system of claim 1 wherein the positioning mechanism positions the keyboard bezel by sliding the keyboard bezel with respect to the keys of the keyboard.

9. The system of claim 8 wherein the sliding slides the keyboard bezel in at least a direction along one of the axes of the keyboard.

10. The system of claim 1 wherein the positioning mechanism comprises a rail that comprises a position dependent on pivot angle of the display housing with respect to the keyboard housing.

11. The system of claim 1 wherein the positioning mechanism comprises a cam that comprises a rotational position dependent on pivot angle of the display housing with respect to the keyboard housing.

12. The system of claim 11 comprising a rail that contacts the cam and that contacts the keyboard bezel to position the keyboard bezel dependent on pivot angle of the display housing with respect to the keyboard housing.

13. The system of claim 1 wherein the positioning mechanism comprises at least one spring that applies force to the keyboard bezel.

14. The system of claim 1 wherein the other portions of the keyboard bezel that extend underneath the keys prevent depression of the keys.

15. The system of claim 1 wherein the positioning mechanism raises the other portions of the keyboard bezel that extend underneath the keys to contact the keys.

16. A system comprising:
    a keyboard housing that comprises a keyboard and a positionable keyboard bezel, the keyboard defined in a first Cartesian coordinate system as having a width along an x-axis, a length along a y-axis and a height along a z-axis that extends in a direction outwardly away from touch surfaces of keys of the keyboard;
    a display housing that comprises a display, the display defined in a second Cartesian coordinate system as having a width along an x-axis, a length along a y-axis and a height along a z-axis that extends in a direction outwardly away from a viewing surface of the display;
    a hinge that pivotably connects the keyboard housing and the display housing for orienting the display housing with respect to the keyboard housing; and
    a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing wherein the second orientation comprises a pivot angle for the display housing with respect to the keyboard housing of approximately 360 degrees wherein the z-axis of the display and the z-axis of the keyboard point away from each other, and
    wherein the display housing comprises an extension and wherein the keyboard housing comprises an opening configured to receive the extension in the second orientation of the display housing with respect to the keyboard housing for positioning the keyboard bezel in the second state.

17. The system of claim 16 wherein the positioning mechanism comprises a spring that applies force to the keyboard bezel for forcing the keyboard bezel from the second state to the first state.

18. A system comprising:
    a keyboard housing that comprises a keyboard and a positionable keyboard bezel, the keyboard defined in a first Cartesian coordinate system as having a width along an x-axis, a length along a y-axis and a height along a z-axis that extends in a direction outwardly away from touch surfaces of keys of the keyboard;

a display housing that comprises a display, the display defined in a second Cartesian coordinate system as having a width along an x-axis, a length along a y-axis and a height along a z-axis that extends in a direction outwardly away from a viewing surface of the display;

a hinge that pivotably connects the keyboard housing and the display housing for orienting the display housing with respect to the keyboard housing; and a positioning mechanism that positions the keyboard bezel in a first state with respect to the keyboard for a first orientation of the display housing with respect to the keyboard housing and that positions the keyboard bezel in a second state with respect to the keyboard for a second orientation of the display housing with respect to the keyboard housing wherein the second orientation comprises a pivot angle for the display housing with respect to the keyboard housing of approximately 360 degrees wherein the z-axis of the display and the z-axis of the keyboard point away from each other, and wherein the keyboard bezel comprises an extension and wherein the display housing comprises a surface configured to contact the extension in the second orientation of the display housing with respect to the keyboard housing for positioning the keyboard bezel in the second state.

19. The system of claim 18 wherein the positioning mechanism comprises a spring that applies force to the keyboard bezel for forcing the keyboard bezel from the second state to the first state.

* * * * *